United States Patent
Perng et al.

(10) Patent No.: US 8,783,875 B2
(45) Date of Patent: Jul. 22, 2014

(54) LIGHT COMPENSATION SCHEME, OPTICAL MACHINE DEVICE, DISPLAY SYSTEM AND METHOD FOR LIGHT COMPENSATION

(75) Inventors: Nei-Chiung Perng, Taipei (TW); Chih-nan Wei, Kaohsiung (TW); Po-Yao Chuang, Taipei (TW)

(73) Assignee: Genesys Logic, Inc., Taipei (TW)

(*) Notice: Subject to any disclaimer, the term of this patent is extended or adjusted under 35 U.S.C. 154(b) by 787 days.

(21) Appl. No.: 12/642,459

(22) Filed: Dec. 18, 2009

(65) Prior Publication Data
US 2011/0080534 A1 Apr. 7, 2011

(30) Foreign Application Priority Data
Oct. 1, 2009 (TW) ................ 98133439 A (51) Int. Cl.
G03B 21/14 (2006.01)
G02F 1/13363 (2006.01)

(52) U.S. Cl.
USPC ................... 353/85; 353/20; 353/31; 353/94; 349/5

(58) Field of Classification Search
USPC ........ 353/20, 31, 33, 34, 37, 85, 94; 349/5, 7, 349/8, 9
See application file for complete search history.

(56) References Cited

U.S. PATENT DOCUMENTS

| | | | |
|---|---|---|---|
| 5,902,031 A * | 5/1999 | Urabe | 353/31 |
| 6,334,685 B1 * | 1/2002 | Slobodin | 353/31 |
| 2004/0095550 A1 * | 5/2004 | Tai | 349/194 |
| 2006/0170883 A1 * | 8/2006 | Matsui | 353/85 |
| 2006/0279710 A1 * | 12/2006 | Tani | 353/85 |
| 2008/0055493 A1 * | 3/2008 | Hanano | 349/9 |
| 2009/0109409 A1 * | 4/2009 | Haraguchi et al. | 353/85 |
| 2010/0002197 A1 * | 1/2010 | Kaneko | 353/31 |
| 2010/0302515 A1 * | 12/2010 | Plut | 353/85 |
| 2010/0328616 A1 * | 12/2010 | Silverstein et al. | 353/31 |

* cited by examiner

*Primary Examiner* — William C Dowling (57) ABSTRACT

A light compensation scheme, an optical machine device, a display system and a method for light compensation are disclosed herein. The light compensation scheme includes a detector for inspecting a data related to a luminous flux of each of different color beams, and a controller for selectively adjusting anytime a luminosity of at least one of a plurality of pointolites and/or the transmittances of at least one part of liquid crystals disposed within a liquid crystal display panel, based on the inspected data.

30 Claims, 7 Drawing Sheets

LIGHT COMPENSATION SCHEME, OPTICAL MACHINE DEVICE, DISPLAY SYSTEM AND METHOD FOR LIGHT COMPENSATION

CLAIM OF PRIORITY

This application claims priority to Taiwanese Patent Application No. 098133439 filed on Oct. 1, 2009.

BACKGROUND OF THE INVENTION

1. Field of the Invention

The present invention relates to a light compensation scheme, an optical machine device, a display system and a method for light compensation, and more particularly, to an optical machine device which is capable of actively compensating uniformity of illumination by a light compensation scheme.

2. Description of the Prior Art

Presently, a good few display systems, such as a projector, a projecting display or a high-definition television (HDTV) system, adapt a Liquid Crystal on Silicon (LCoS) technology which is adequate for a high-resolution, large-screen display sized to be slim and rendering higher brightness and contrast than the conventional liquid crystal display (LCD) did. Such a LCoS display system primarily includes an illumination module, a polarizing beam splitter (PBS), a active-matrix LCoS panel, at least one color separation set, lots of optical lenses, a projecting lens and a screen, wherein the illumination module, the polarizing beam splitter, the active-matrix LCoS panel, the at least one color separation set, the optical lenses and the projecting lens can constitute an optical machine device or a so-called "optical engine", with corresponding beam pathways built among the above-mentioned elements. The illumination modules of the most conventional LCoS display systems employ a monochromatic light source like an arc lamp to emit monochromatic beams. Each of the monochromatic beams needs to pass through the at least one color separation set (e.g. a color filter) to be separated into different-color beams (e.g. the red (R), green (G) and blue (B) of three primary colors). Afterward the different-color beams are transmitted via the corresponding optical lenses and the polarizing beam splitter to the LCoS panel. However, the above-mentioned arrangements might easily invoke higher optical losses and lower luminosities among the whole during light transmission, especially in that the several optical lenses are often used to transmit different-color beams each which must be ensured in accurate alignment with the corresponding beam pathways, whereby their beam pathway designs become more complicated and costly. When the different-color beams are polarized by the polarizing beam splitter to emit the corresponding polarized beams incident to the LCoS panel, a plurality of pixel electrodes arranged in active matrixes of the LCoS panel possess direction change of liquid crystals (LCs) based on a specific voltage applied on modulating the different-color polarized beams. Then the different-color polarized beams are separated into corresponding reflective beams for forming a full-color image. The different-color reflective beams of the image are reflected from the LCoS panel to the screen via the polarizing beam splitter and the projecting lens so that an imaging frame is visibly displayed on the screen. In another case of replacing the monochromatic light source with a driven-by-motor color wheel to separate different-color beams, many more lens sets are accordingly used for the separated respective different-color beams. However, this causes the whole beam path design much more complicated and occupying more optical engine space, and even its optical loss and the element costs increased, greatly. In another case of using three LCoS panels for individually processing different-color beams (e.g. red (R), green (G) and blue (B) of three primary colors), the amounts of full-reflective optical lenses and full-transmissive optical lenses in use need to increase, accordingly and each of the different-color beams correspondingly meets more complicated beam pathways. That would be more costly.

Figure 1:
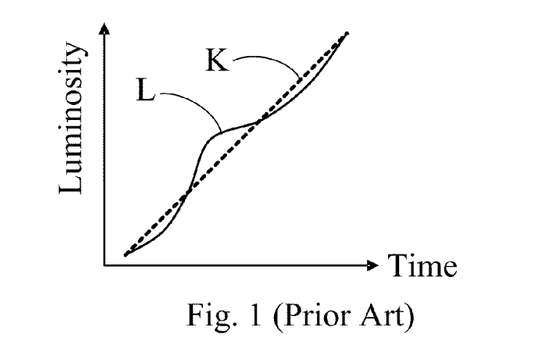
FIG. 1 illustrates a luminosity-versus-time measurement coordinate diagram of a conventional display system where several beams emitted from a monochromatic light source pass through some corresponding optical lenses.

Besides even the monochromatic light source emits beams via the same optical lens, the luminous intensities of the different-color beams reflected from the LCoS panel might be uneven if the angles of emitting the respective beams are different, the beam pathways where the different-color beams pass from the monochromatic light source to the LCoS panel are different or the performances of the respective light sources are inconsistent. For an example of uneven luminosities, a luminosity difference occurs between a central region and a boundary region on a surface of the LCoS panel. As a coordinate diagram shown in FIG. 1, the respective luminosity values (L) of the beam transmitted from the monochromatic light source to the LCoS panel via the same optical lens appear in unevenness, in comparison with a characteristic value (K) representing a finished light source which is qualified.

Figure 2A:
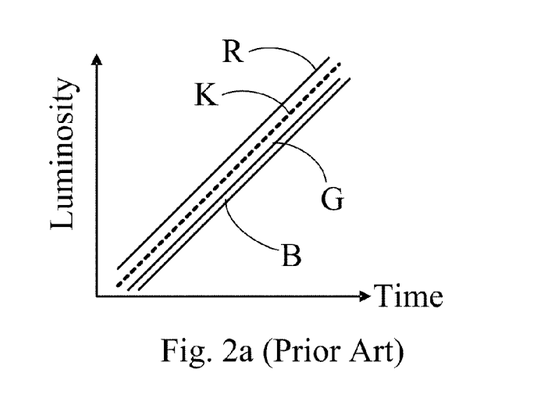
FIG. 2a illustrates a luminosity-versus-time measurement coordinate diagram of another conventional display system where several beams are emitted from a plurality of different-color light sources.
Figure 2B:
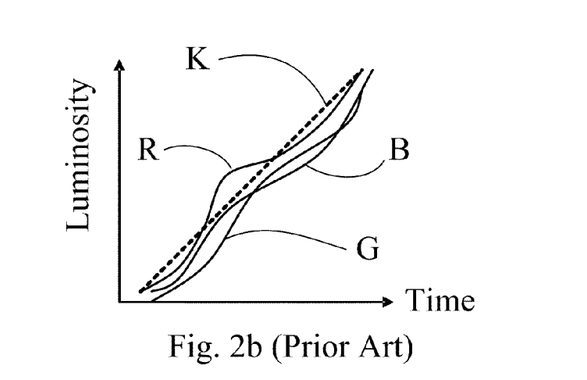
FIG. 2b illustrates a luminosity-versus-time measurement coordinate diagram of another conventional display system where several beams emitted from a plurality of different-color light sources pass through some corresponding optical lenses.

Currently, the illumination modules of many conventional large-sized display systems employ a plurality of different-color light sources (e.g. the red (R), green (G) and blue (B) light emitting diodes (LEDs)) to be pointolites. There have some inherent defects that both luminance efficiency and uniform illumination of the LED pointolites are controlled more difficult than a linear light source revealed by a conventional cold cathode fluorescent lamp (CCFL). To achieve the optimal uniform illumination, it becomes essential to pick matching-characteristic ones from the finished LEDs. Such a picking-product step would cause the cost increased. If the luminosities revealed from the different-color LEDs are uneven, an illustration shown in FIG. 2a may happen that a luminosity value (R) of the red light source is higher than the characteristic value (K) representing a qualified product but the luminosity values of the other light sources (e.g. the green and blue lights) is lower than the characteristic value (K). Thus, there is a luminosity difference occurring among these light sources. Besides if the locations of the different-color light sources are different or inaccurate, for example, one of the different-color light sources is allocated askew upwardly but another one is allocated askew downwardly, this would make different illuminative angles where the respective beams of the different-color light sources pass through the optical lens. Furthermore, due to the optical losses during reflection and/or transmittance of the beams through the corresponding lens allocated on the respective beam pathways, the luminous intensities (or the luminosity value) of the different-color beams incident into the LCoS panel are invoked uneven, as the result shown in FIG. 2b.

BRIEF SUMMARY OF THE INVENTION

To improve the abovementioned drawbacks, a primary object of the present invention is to provide a light compensation scheme, an optical machine device, a display system and a method for light compensation, which can reduce an inner space of the optical machine device and lower the manufacturing cost due to the needlessness of using a color separation set, a color filter or color wheel to separate the monochromatic beams of the monochromatic light source into different-color beams as done by the prior art.

Besides, another object of the present invention is to provide a light compensation scheme, an optical machine device, a display system and a method for light compensation, which can actively calibrate the luminosity of each of the light sources anytime by the light compensation scheme to further greatly reduce the inner space of the optical machine device and lower both of the manufacturing cost and the calibrating cost due to the needlessness of designing and arranging the beam pathways and lens in an accurate alignment with the corresponding different-color beam as done by the prior art.

Another object of the present invention is to provide a light compensation scheme, an optical machine device, a display system and a method for light compensation, which can shorten the beam pathways corresponding to each of the different-color beams and lessen the optical losses thereamong.

Another object of the present invention is to provide a light compensation scheme, an optical machine device, a display system and a method for light compensation, which can raise the uniform illumination of the different-color beams.

To accomplish the above invention objects, a preferred embodiment of the present invention introduces a display system primarily includes an optical machine device and a screen. The optical machine device further comprises a plurality of different-color pointolites, a optical lens, a polarizing beam splitter (PBS), a liquid crystal (LC) panel, a projecting lens and a light compensation scheme, wherein the plurality of different-color pointolites emit a plurality of different-color illuminating beams in turns based on time sequences. The optical lens is employed for possessing the pathway directions of the different-color illuminating beams. The polarizing beam splitter is employed to directly receive the different-color illuminating beams possessed by the optical lens to correspondingly form a plurality of different-color polarized incident beams. The LC panel has a plurality of liquid crystals used for receiving the plurality of different-color polarized incident beams to correspondingly form a plurality of different-color reflective beams upon the transmittance of the liquid crystals. Then the different-color reflective beams are polarized by the polarizing beam splitter into a plurality of different-color polarized reflective beams. The projecting lens is employed for receiving the plurality of different-color polarized reflective beams to correspondingly project different-color projected beams toward the outside of the optical machine device via the projecting lens. The light compensation scheme has at least one detector for inspecting a data related to a luminous flux of at least one of the different-color illuminating beams, the different-color polarized incident beams, the different-color reflective beams, the different-color polarized reflective beams and the different-color projected beams, and a controller for selectively adjusting a luminosity of at least one of the pointolites and/or the transmittances of at least one part of the liquid crystals, based on said data transmitted from the at least one detector, wherein said inspected data is one of a luminous flux, a luminosity, an illuminance and a brightness of the at least one beam.

The controller further has a logistic core used for determining a quantity of adjusting the luminosity of the at least one pointolite, according to a difference between each of said inspected data and a predetermined characteristic value. Alternatively, the logistic core can determine one of a voltage value, a current value and a time sequence by a lookup table and/or an operation of a calculating unit so as to a quantity of adjusting the luminosity of at least one of the pointolites and/or the transmittances of at least one part of the liquid crystals, according to at least one difference among a number of data, with regard to the luminous flux, which are respectively inspected by a plurality of detectors for different inspected regions and/or different time sequences.

In another preferred embodiment, the at least one detector is allocated near to the outside of the LC panel and thereby receives the polarized incident beams. In another preferred embodiment, the at least one detector is allocated near to the outside of the polarizing beam splitter and thereby receives the illuminating beams. In another preferred embodiment, the at least one detector is allocated near to the outside of the projecting lens and thereby receives the polarized reflective beams. In another preferred embodiment, the at least one detector is allocated near to the outside of the optical machine device and thereby receives the projected beams. In another preferred embodiment, the optical machine device comprises a plurality of different-color pointolites, a optical lens, a polarizing beam splitter (PBS), a LC panel, a projecting lens and a controller, wherein the controller is electrically connected with at least one detector so as to calibrate a uniform illumination of the respective pointolites. In another preferred embodiment, the at least one detector is implemented with a camera to capture an image frame composed of different-color beams from the screen.

Besides the present invention also introduces a method for light compensation applied in a display system, and the method comprises the following steps of:

inspecting at least one first data with regard to a luminous flux, under different time sequences, on at least one of different-color beams which is transmitted from at least one of a plurality of pointolites through at least one of beam pathways established in the display system, wherein the at least one first data is as a luminosity;

determining a difference between each of the at least one first data and a predetermined characteristic value;

according to the at least one first data and/or the difference, determining one of a voltage value, a current value and a time sequence by a lookup table and/or an operation of a calculating unit so as to adjust the luminosity of the at least one pointolite to be greater than or approach the predetermined characteristic value;

inspecting at least one second data with regard to a luminous flux, under the same and/or different time sequences, on at least one of different-color beams which is transmitted from at least one of pointolites through at least one of beam pathways established on different inspected regions of the display system, wherein the at least one second data is as a luminosity;

determining whether at least one difference occurs among a number of second data inspected on the different-color beams passing at least one of the different inspected regions under the different time sequences;

according to the number of second data inspected on the different-color beams and/or the at least one difference, determining one of a voltage value, a current value and a time sequence by the lookup table and/or the operation of the calculating unit so as to adjust the highest luminosity which one of the pointolites has to be the lowest luminosity which of one of the pointolites has, with meeting the predetermined characteristic value;

determining whether at least one difference occurs (as unevenness occurs) among the number of second data inspected on the same color beams passing the different inspected regions under the same time sequences; and according to the number of second data inspected on the same color beams and/or the at least one difference, determining one of a voltage value, a current value and a time sequence by the lookup table and/or the operation of the calculating unit so as to adjust the transmittances of at least one part of liquid crystals located on a corresponding inspected region having the lowest luminosity than the luminosities of the other inspected regions.

The advantages and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which.

DETAILED DESCRIPTION OF THE INVENTION

Figure 3A:
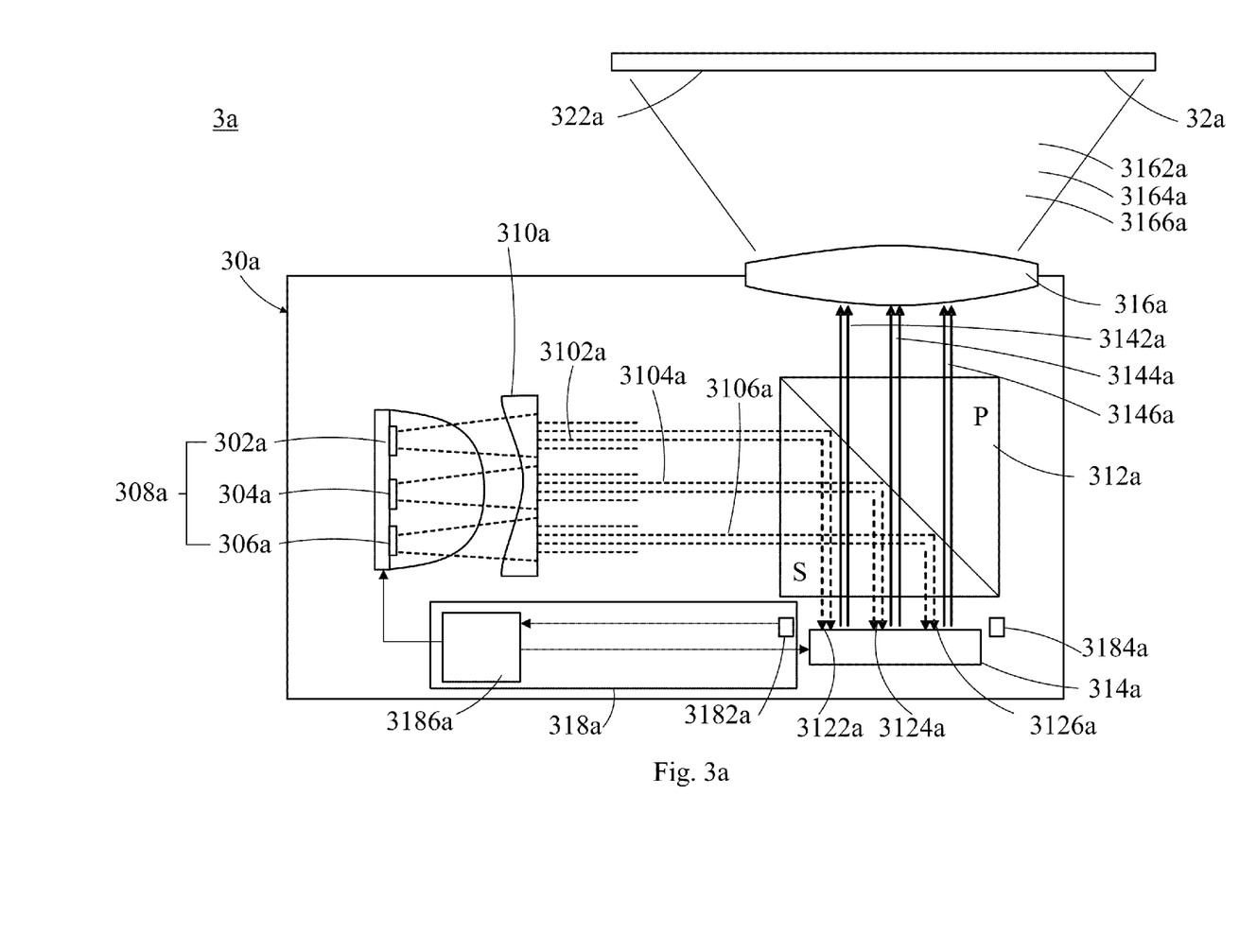
FIG. 3a illustrates an architectural block diagram of a display system according to a first preferred embodiment of the present invention.

Firstly referring to an illustration of FIG. 3a, a display system 3a according to a first preferred embodiment of the present invention is applicable for different fields like a projector, a projecting display or a High-definition television (HDTV) system and principally includes an optical machine device (or a so-call "optical engine") 30a and a flat type screen 32a, wherein the optical machine device 30a further comprises a plurality of different-color pointolites 302a, 304a and 306a, a optical lens 310a, a polarizing beam splitter (PBS) 312a, a liquid crystal (LC) panel 314a, a projecting lens 316a and a light compensation scheme 318a. The related principle of said elements will be detailed below.

In this first embodiment shown in FIG. 3a, the plurality of different-color pointolites 302a, 304a and 306a are implemented with a set of different-color (e.g. the red (R), green (G) and blue (B)) light emitting diodes (LEDs) which are packaged together into a illumination module 308a. Allocations of the different-color LEDs in the illumination module 308a are different from each other. For example, the red LED may be allocated askew toward an upper part of the illumination module 308a, the green LED may be allocated askew toward a central part of the illumination module 308a and the blue LED may be allocated askew toward a lower part of the illumination module 308a. To achieve a visional persistence effect, the plurality of different-color pointolites 302a, 304a and 306a utilizes a color-sequential technology which respectively emit different-color illuminating beams 3102a, 3104a and 3106a in turns based on different time sequences so as to constitute a full-color image frame with a needlessness of using a typical color filter.

In this first embodiment, the optical lens 310a implemented as a concave lens is employed to possess several pathway directions of the different-color illuminating beams 3102a, 3104a and 3106a being paralleled with each other and directly illuminating the polarizing beam splitter 312a. This leads to better evenness of the luminosities of the different-color illuminating beams 3102a, 3104a and 3106a illuminating the polarizing beam splitter 312a. Noted is that each of those beams pathways where the different-color illuminating beams 3102a, 3104a and 3106a correspondingly pass is a pathway established without implementation of color separation. It means that it is unessential to use a color separation set, a color filter or a color wheel during each of the beams pathways. Compared with the prior art as aforementioned, the present invention can greatly reduce an inner space or a scale of the whole optical machine device 30a due to largely decreases of using reflective lens set and establishing beam pathways within the optical machine device 30a. In association, its manufacturing cost can be lowered.

The polarizing beam splitter 312a has a first polarizing portion (S) used for directly receiving and polarizing the different-color illuminating beams 3102a, 3104a and 3106a of which the corresponding beams pathway directions are possessed by the optical lens 310a, and thereby correspondingly forming a plurality of different-color polarized incident beams 3122a, 3124a and 3126a incident into the LC panel 314a. The polarizing beam splitter 312a further has a second polarizing portion (P) functioning as detailed later.

In this first embodiment, the LC panel 314a implemented as a liquid crystal on silicon (LCoS) panel has a plurality of liquid crystals (LCs), and a plurality of pixel units (e.g. pixel electrodes) arranged in matrix and controlling a direction change of at least one part of the liquid crystals based on different applied voltage so as to vary a transmittance of the at least one part of the liquid crystals. When the liquid crystals of the LC panel 314a receive the plurality of different-color polarized incident beams 3122a, 3124a and 3126a transmitted from the first polarizing portion (S) of the polarizing beam splitter 312a, a plurality of different-color reflective beams of an image are correspondingly formed by reflection of the LC panel 314a upon the transmittances of the liquid crystals. Then, the different-color reflective beams of the image are polarized by the second polarizing portion (P) of the polarizing beam splitter 312a to emit a plurality of different-color polarized reflective beams 3142a, 3144a and 3146a, correspondingly.

The projecting lens 316a is employed for receiving the plurality of different-color polarized reflective beams 3142a, 3144a and 3146a, and correspondingly forming and projecting a plurality of different-color projected beams 3162a, 3164a and 3166a toward the screen 32a located on an outside of the optical machine device 30a, via the projecting lens 316a. Eventually, a full-color image is visibly formed on the screen 32a by the plurality of different-color projected beams 3162a, 3164a and 3166a.

As mentioned above, although an emitting allocation and/or an angle of any one of the plurality of different-color pointolites 302a, 304a and 306a may be skewed or a lighting characteristic of any one of the plurality of different-color pointolites 302a, 304a and 306a may be different from each other after manufactured, the present invention can avoid occurrence of unevenness in the luminosities of the various beams from the different-color pointolites 302a, 304a and 306a, by a way that the light compensation scheme 318a actively performs a luminosity calibration on at least required one of the different-color pointolites 302a, 304a and 306a upon a data (e.g. a luminosity) feedback from anywhere of the optical machine device 30a. In this first embodiment, the light compensation scheme 318a has at least one detector 3182a which is allocated near to an outside of the circumference of the LC panel 314a but does not block the beam pathway to the liquid crystals, and is used for inspecting a data related to a luminous flux of at least one of the different-color polarized incident beams 3122a, 3124a and 3126a. The light compensation scheme 318a further has a controller 3186a for selectively adjusting a luminosity of at least one of the pointolites 302a, 304a and 306a and/or the transmittances of at least one part of the liquid crystals, based on said data transmitted from the at least one detector 3182a.

In this first embodiment, the at least one detector 3182a can be implemented in a charge coupled device (CCD), a CMOS image sensor (CIS) or a capturing-image device like a camera. The said data inspected by the at least one detector 3182a can be one of a luminous flux, a luminosity, an illuminance and a brightness of any one of the various beams passing anywhere of the optical machine device 30a, and is transmitted to the controller 3186a in a signal of analog or digital type. Various definitions of a luminous flux, a luminosity, an illuminance and a brightness are introduced as following.

(1) Luminous flux ($\Psi$) is defined as a measurement of all power emitted by a light source along all directions per unit time. The SI unit of luminous flux is the "lumen (lm)".

(2) Luminous intensity (I) is defined that a measurement of a one-lumen power emitted by a point light source along a specific direction per unit solid angle (W) is called as one candela of luminous intensity. The SI unit of luminous intensity is the candela (cd or cp). Also, a luminosity is often used as the density of luminous intensity in a given direction.

(3) Illuminance (E) is defined as a measurement of the total luminous fluxes per perceived unit area. In SI derived units, these are both measured in "lux (lx)" or lumens per square meter ($cd \cdot sr \cdot m^{-2}$). For example, one lumen per perceived unit area with one square meter is called as one lux.

(4) Brightness (L) is defined as a measurement of luminances per unit area by a radiating or reflected light from a point of a light source or a reflective surface along a visual observation direction. The SI unit of brightness is $cd/m^2$.

In other applications, there are two detectors 3182a, 3184a or more than the two detectors 3182a, 3184a respectively allocated/arranged on different positions outside of the circumference of the LC panel 314a. For example, multi-detector arrangements can be implemented along at least one diagonal of the LC panel 314a, along the circumference of the LC panel 314a or each side of the LC panel 314a. By said detector arrangements, the amount of the inspected area in the same the LC panel 314a can be increased, greatly to raise the accuracies of luminosity calibrations on the respective different-color pointolites 302a, 304a and 306a.

In this first embodiment, the controller 3186a is implemented in an ASIC-based control integrated chip, which is electrically connected with the respective different-color pointolites 302a, 304a and 306a and the LC panel 314a. The controller 3186a further has a logistic core implemented in software or hardware. Initially, the logistic core is used to determine whether at least one data related to a luminous flux of each of the different-color polarized incident beams 3122a, 3124a and 3126a inspected and fed back by the detector 3182a is larger than or approaches a predetermined characteristic value which represents a qualified product or a preset standard so as to achieve any one difference between each of said inspected data and the predetermined characteristic value. Then the logistic core determines a quantity of adjusting the luminosity of one at least one of the different-color pointolites 302a, 304a and 306a which such a difference corresponds to. In an applicable case for the same inspected region, if a predetermined characteristic value is set by "1, a data (e.g. a luminosity) for a green beam of the green pointolit 304a may be inspected by the detector 3182a to "1.4" but another data (e.g. a luminosity) for a blue beam of the blue pointolit 306a and another data (e.g. a luminosity) for a red beam of the red pointolit 302a may be inspected by the detector 3182a to "0.9", both of which are less than the predetermined characteristic value. At this time, the logistic core can determine one of a voltage value, a current value and a time sequence by a lookup table and/or an operation of a calculating unit so as to adjust the luminosities of the blue and red pointolit 306a, 302a until the logistic core determines that the luminosities of the blue and red pointolits 306a, 302a inspected by the detector 3182a are greater than or approach the predetermined characteristic value, according to some luminosity differences of the blue and red pointolit 306a, 302a from the predetermined characteristic value.

In another applicable case for different inspected regions, the logistic core of the controller 3186a can determine any one difference among a number of data, with regard to a luminous flux, respectively inspected and fed back by the plurality of detectors 3182a, 3184a. Then, according to such a difference, the logistic core can determine a quantity of adjusting a luminosity of at least one of the different-color pointolites 302a, 304a and 306a and/or transmittances of at least one part of liquid crystals of the LC panel 314a until the number of data (e.g. the luminosities) respectively inspected and fed back by the plurality of detectors 3182a, 3184a can approach consistence so as to even the luminosities inspected from the different inspected regions in the same LC panel 314a. For example, for the same time sequence, a data (i.e. a luminosity) for an upper-half region of the same LC panel 314a may be inspected by the detector 3182a to "1.8" but another data (i.e. a luminosity) for a lower-half region of the same LC panel 314a may be inspected by another detector 3184a to "1". It represents that a luminosity difference of "0.8" occurring between the luminosities of the both inspected regions results in unevenness of the luminosities. At this time, according to the luminosity difference of "0.8", the logistic core can determine one of a voltage value, a current value and a time sequence by the lookup table and/or an operation of the calculating unit to adjust the transmittances of at least one part of liquid crystals of the LC panel 314a. For example, the transmittance of liquid crystals of the upper-half region of the same LC panel 314a is adjusted down to lessen the transmission amounts of the beams (as darkening this upper-half region), until the logistic core determines that the data (e.g. the luminosity) inspected from of the upper-half region by the detector 3182a is consistent with another data "1" of the lower-half regions (but still meets the predetermined characteristic value), so as to create a high uniform illumination for the whole LC panel 314a.

Understandably, the controller 3186a can not only process the unevenness among the luminosities (as the number of data) of the different inspected regions inspected by different detectors 3182a and 3184a for the same time sequence (as the same color beam) but can also synchronously process the unevenness among the luminosities (as the number of data) of the different-color pointolites 302a, 304a and 306a inspected by the same detector 3182a or 3184a (or for the same inspected region) under the different time sequences. For example, for a first time sequence, a data (i.e. a luminosity) of a red beam for the upper-half region of the same LC panel 314a may be inspected by the detector 3182a to "1.4" but a data (i.e. a luminosity) of another red beam for a lower-half region of the same LC panel 314a may be inspected by another detector 3184a to "1". For a following second time sequence, a number of data (i.e. a number of luminosities) of green beams for both of the upper-half and lower-half regions of the same LC panel 314a may be inspected by the detectors 3182a and 3184a to "1.9". It represents that besides a first luminosity difference of "0.4 occurring between the luminosities (as the number of data) on both of the upper-half and lower-half regions results in a luminosity unevenness, a second luminosity difference of "0.9" occurring between the luminosities of the red and greed beams for the same lower-half region. According to the first and second luminosity differences, the logistic core of the controller 3186a can determine one of a voltage value, a current value and a time sequence by the lookup table and/or an operation of the calculating unit to gradually adjust down the highest luminosity (as "1.9") which one of the pointolites 302a, 304a and 306a has (as the green pointolite 304a) to be consistent with the lowest luminosity (as "1") which one of the pointolites 302a, 304a and 306a has (as the red pointolite 302a emitting the red beam to the lower-half region). Besides the logistic core also synchronously determine another one of a voltage value, a current value and a time sequence to adjust down the transmittance of a part of liquid crystals located on the upper-half region of the LC panel 314a to become dark for the red beams whereby the luminosity (as "1.4") of the red beam for the upper-half region can be correspondingly adjusted down to be consistent with the luminosity (as "1") of the red beam for the lower-half region.

Thus, by an active adjustment of the optical compensation scheme according the first embodiment of the present invention, a higher uniform illumination of the different-color pointolites 302a, 304a and 306a for the display system 3a can be maintained anytime under the same and different time sequence. Such an optical machine device before sold out will not need to be accurately calibrated and therefore can save a calibration cost for the manufacturer.

Figure 3B:
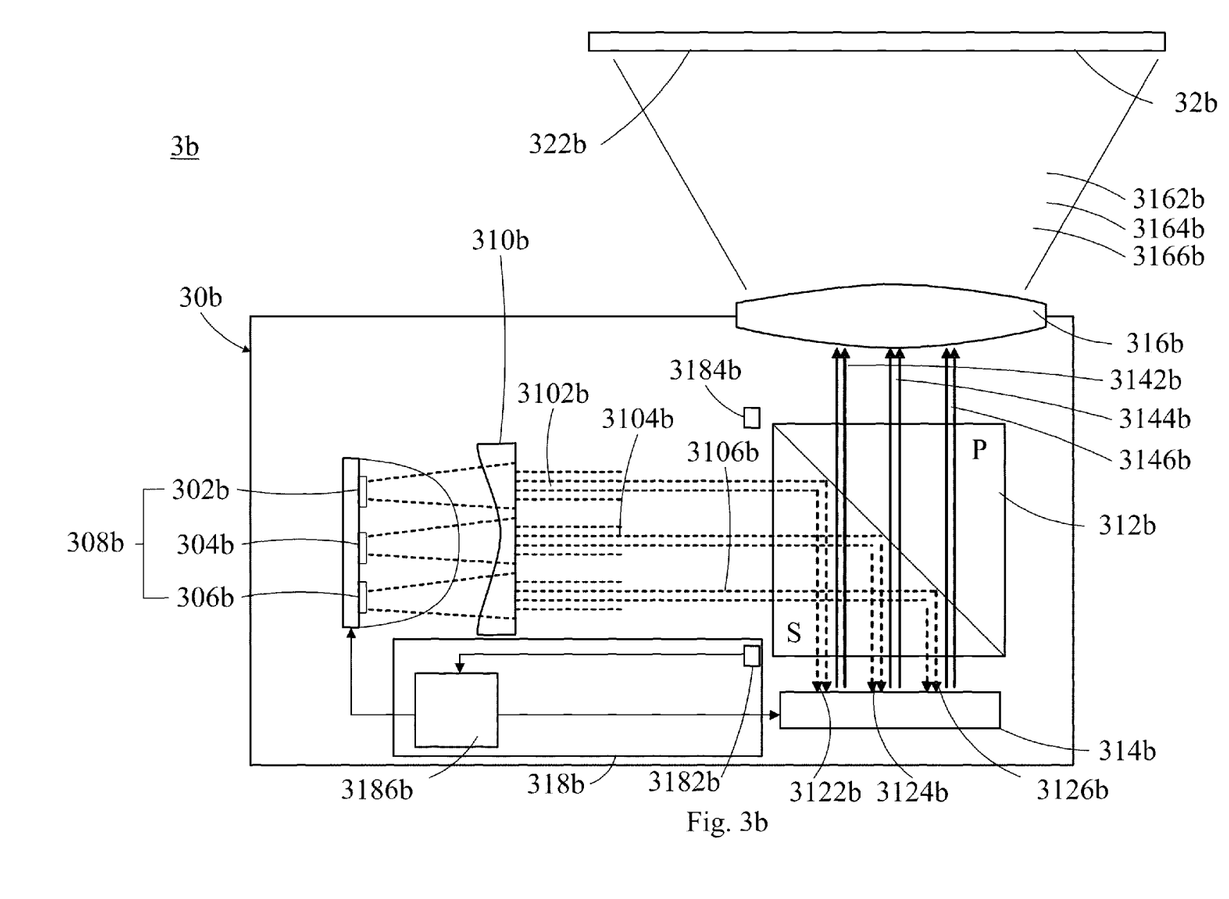
FIG. 3b illustrates an architectural block diagram of a display system according to a second preferred embodiment of the present invention.

Further referring to an illustration of FIG. 3b, a display system 3b according to a second preferred embodiment of the present invention is introduced, which allocates two detectors 3182b, 3184b differently from the detectors 3182a, 3184a of the display system 3a of the first embodiment. That is because the detectors 3182b, 3184b are allocated on a direction of a beam pathway established between the polarizing beam splitter 312b and the optical lens 301b, near to the outside of the first polarizing portion (S) of the polarizing beam splitter 312b, and thereby receive the plurality of different-color illuminating beams 3102b, 3104b and 3106b transmitted along the beam pathway direction. Based on different time sequences, the detectors 3182b, 3184b respectively inspect a number of data, with regard to the luminous flux, from the different-color illuminating beams 3102b, 3104b and 3106b and feed the number of data back to the controller 3186b for data processing. The other elements will be not described herein again because of being the same as mentioned above in the first embodiment.

Figure 3C:
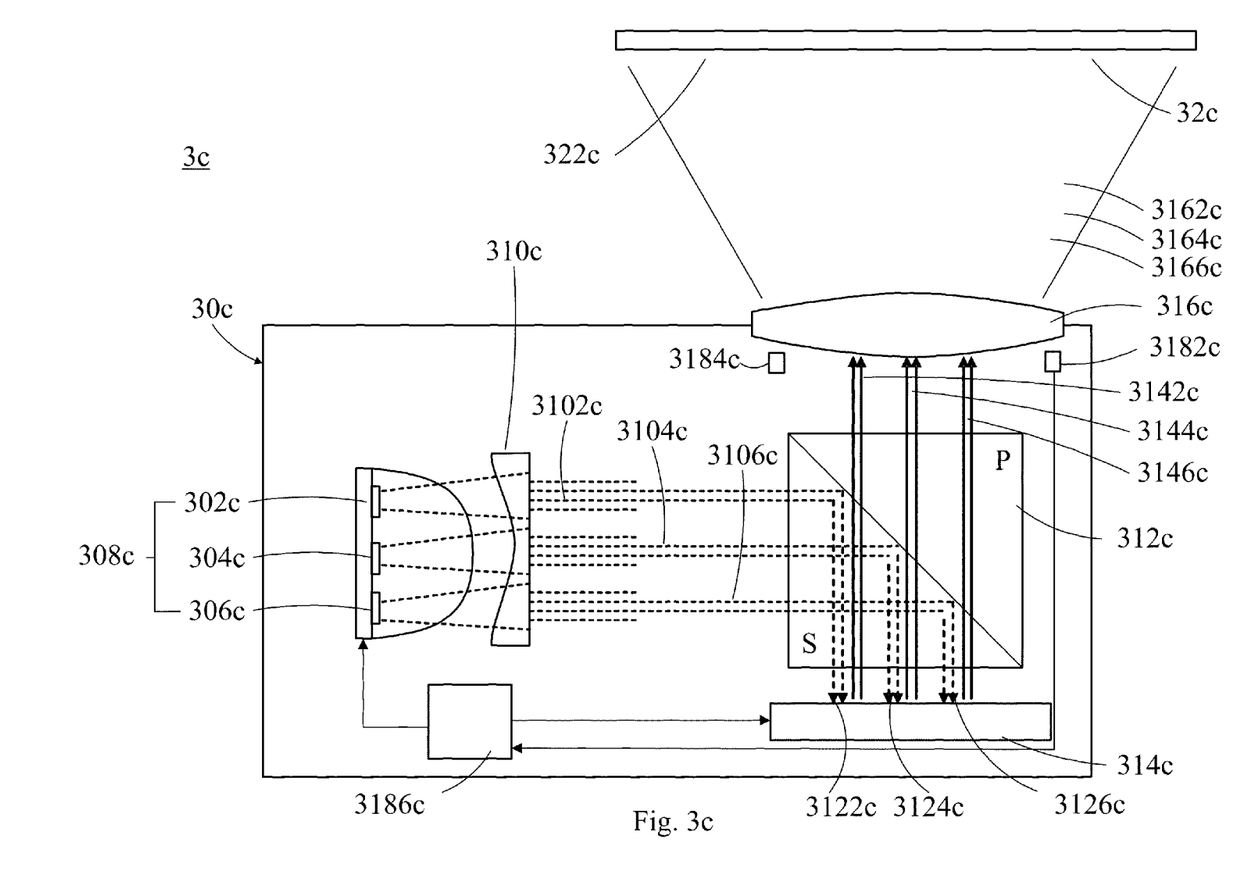
FIG. 3c illustrates an architectural block diagram of a display system according to a third preferred embodiment of the present invention.

Further referring to an illustration of FIG. 3c, a display system 3c according to a third preferred embodiment of the present invention is introduced below, which allocates two detectors 3182c, 3184c differently from the detectors 3182a, 3184a of the display system 3a of the first embodiment. That is because the detectors 3182c, 3184c are allocated on a direction of a beam pathway established between the second polarizing portion (P) of the polarizing beam splitter 312c and the projecting lens 316c, near to the outside of the projecting lens 316c, and thereby receive the plurality of different-color polarized reflective beams 3142c, 3144c and 3146c transmitted along the direction of the beam pathway. Based on different time sequences, the detectors 3182c, 3184c respectively inspect a number of data, with regard to the luminous flux, from the different-color polarized reflective beams 3142c, 3144c and feed the number of data back to the controller 3186c for data processing. The other elements will be not described herein again because of being the same as mentioned above in the first embodiment. In another application, the detectors 3182c, 3184c can be reallocated on a direction of beam pathways established between the first polarizing portion (S) of the polarizing beam splitter 312c and the LC panel 314c, near to the polarizing beam splitter 312c and thereby receive a plurality of the different-color reflective beams (not labeled) transmitted along the beam pathway direction. Based on different time sequences, the detectors 3182c, 3184c respectively inspect a number of data, with regard to the luminous flux, from the different-color reflective beams 3142c, 3144c and feed the number of data back to the controller 3186c for data processing.

Figure 3D:
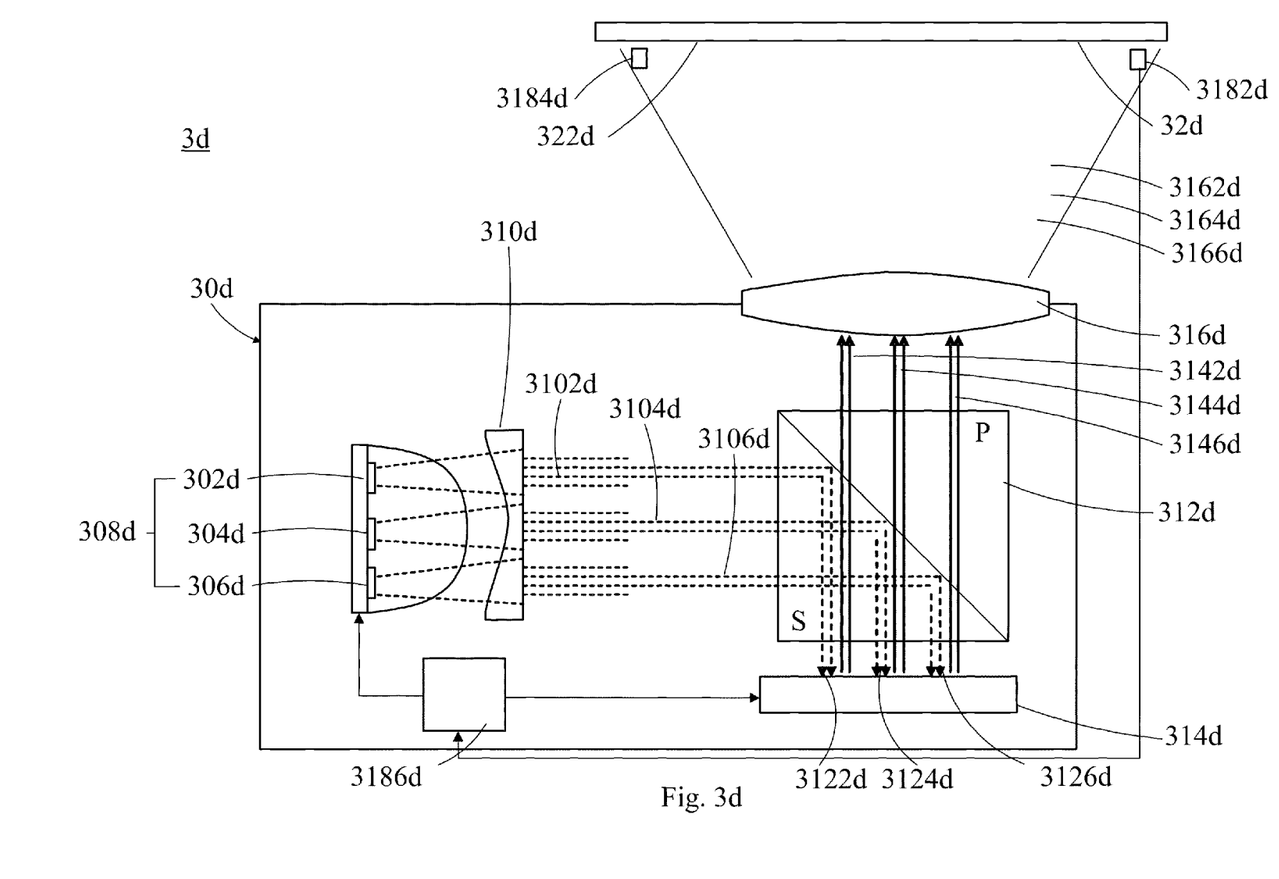
FIG. 3d illustrates an architectural block diagram of a display system according to a fourth preferred embodiment of the present invention.

Further referring to an illustration of FIG. 3d, a display system 3d according to a fourth preferred embodiment of the present invention is introduced below, which allocates two detectors 3182d, 3184d differently from the detectors 3182a, 3184a of the display system 3a of the first embodiment. That is because the detectors 3182d, 3184d are allocated on a direction of a beam pathway established between the projecting lens 316d and the screen 32d, near to the outside of the screen 32d, and thereby receive the plurality of different-color projected beams 3162d, 3164d and 3166d transmitted along the direction of the beam pathway, wherein the plurality of different-color projected beams 3162d, 3164d and 3166d can constitute an image on the screen 32d. Based on different time sequences, the detectors 3182d, 3184d respectively inspect a number of data, with regard to the luminous flux, from the plurality of different-color projected beams 3162d, 3164d and 3166d and feed the number of data back to the controller 3186d for data processing. The other elements will be not described herein again because of being the same as mentioned above in the first embodiment. In another case, the optical machine device 30d according to the fourth embodiment merely includes a plurality of different-color pointolites 302d, 304d and 306d, a optical lens 310d, a polarizing beam splitter 312d, a LC panel 314d, a projecting lens 316d and a controller 3186d but excludes the detectors 3182d, 3184d therefrom since the detectors 3182d, 3184d belong to the prior calibrating and measuring instrument commonly used for the manufacturing factory. Before the optical machine device 30d is sold out of the manufacturing factory, the prior detectors 3182d, 3184d are used to be electrically connected with the controller 3186d for performing a uniform illumination calibration and measurement of each of the different-color pointolites 302d, 304d and 306d. As long as such a uniform illumination calibration and measurement for the different-color pointolites 302d, 304d and 306d is finished, the prior detectors 3182d, 3184d will be removed from the electrical connection with the controller 3186d before the optical machine device 30d is sold out, whereby the consumer will not need to perform any uniform illumination calibration for the finished optical machine device 30d.

Figure 3E:
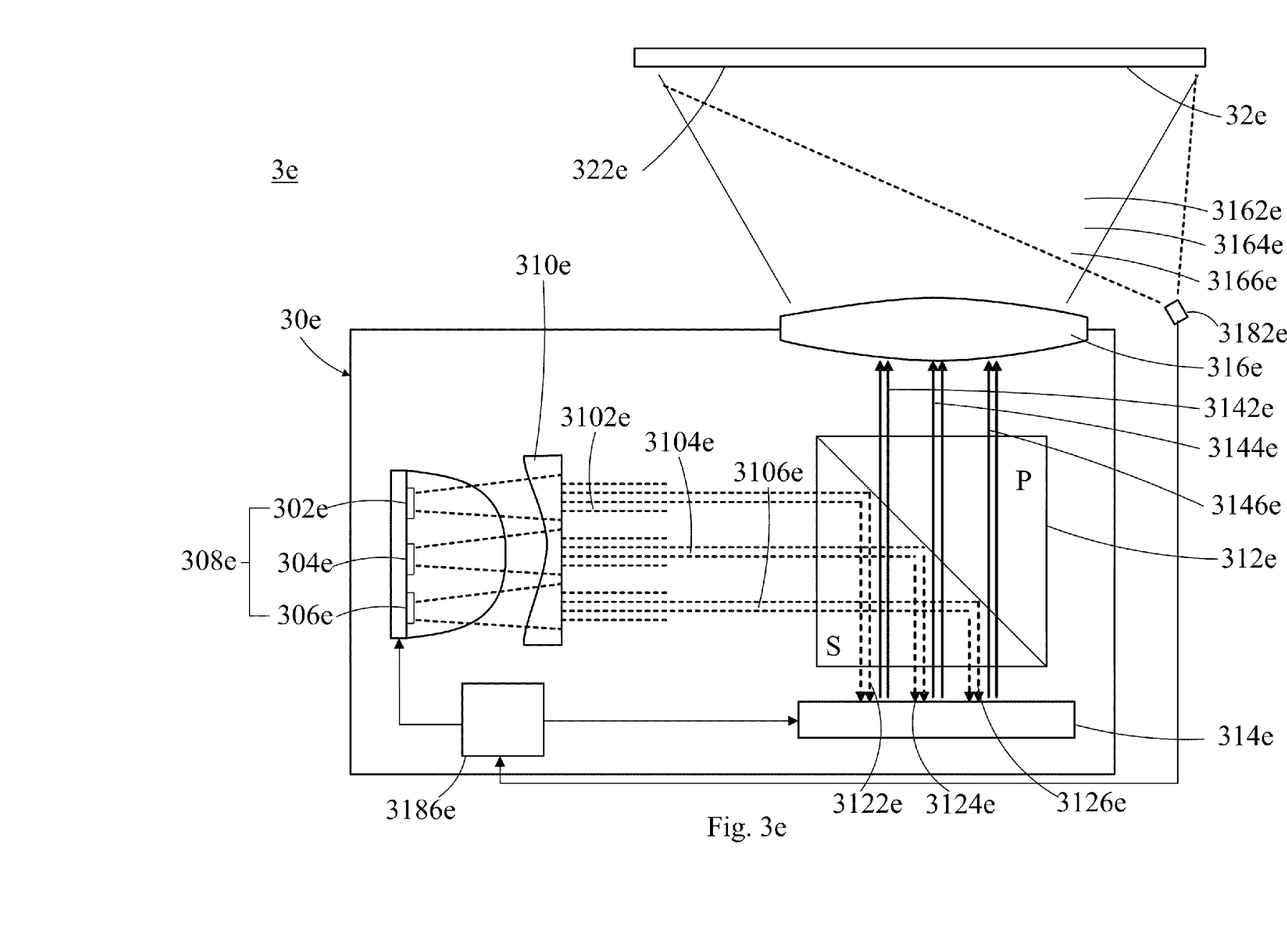
FIG. 3e illustrates an architectural block diagram of a display system according to a fifth preferred embodiment of the present invention.

Further referring to an illustration of FIG. 3e, a display system 3e according to a fifth preferred embodiment of the present invention is introduced below, which has a detector 3182e different from the detector 3182a of the display system 3a of the first embodiment. That is because the detector 3182e is implemented in a capturing-image device as a digital camera and thereby captures at least one image frame displayed in a surface of the screen 32e, which is composed of a plurality of different color beams. Based on different time sequences, the detector 3182e inspects a number of data, with regard to the luminous flux, from the captured image frame and feeds the number of data back to the controller 3186e for data processing. The other elements will be not described herein again because of being the same as mentioned above in the first embodiment. In another case, the optical machine device 30e according to the fifth embodiment merely includes a plurality of different-color pointolites 302e, 304e and 306e, a optical lens 310e, a polarizing beam splitter 312e, a LC panel 314e, a projecting lens 316e and a controller 3186e but excludes the detector 3182e therefrom since the detector 3182e belongs to the prior calibrating and measuring instrument commonly used for the manufacturing factory. Before the optical machine device 30e is sold out of the manufacturing factory, the prior detector 3182e is used to be electrically connected with the controller 3186e for performing a uniform illumination calibration and measurement of each of the different-color pointolites 302e, 304e and 306e. As long as such a uniform illumination calibration and measurement for the different-color pointolites 302e, 304e and 306e is finished, the prior detector 3182e will be removed from the electrical connection with the controller 3186e before the optical machine device 30e is sold out, whereby the consumer will not need to perform any uniform illumination calibration for the finished optical machine device 30e. In another case, since the prism optical lens 310e is just used to keep parallelizing and evening the illuminating beams 3102e, 3104e and 3106e emitted from the different-color pointolites 302e, 304e and 306e, the optical lens 310e can be selectively removed from the optical machine device 30e, without a manner of effecting a normal operation of the optical machine device 30e or its light compensation scheme, if it is necessary to reduce many more space and the element amount of the optical machine device 30e.

Besides a method for light compensation according to the present invention is introduced below, which is applicable for a display system 3a as shown in FIG. 3a. Meanwhile, display system 3a includes a plurality of beams pathways established and interposed among the plurality of different-color pointolites 302a, 304a and 306a, the optical lens 310a, the polarizing beam splitter 312a, the LC panel 314a, the projecting lens 316a and the screen 32a and thereby transmit various different color beams through the plurality of beams pathways. These beams pathways includes but is not limited to a plurality of beam pathways where the different-color illuminating beams 3102a, 3104a and 3106a are transmitted from the plurality of different-color pointolites 302a, 304a and 306a to the polarizing beam splitter 312a via the optical lens 310a, another plurality of beam pathways where the different-color polarized incident beams 3122a, 3124a and 3126a are transmitted from the polarizing beam splitter 312a to the LC panel 314a, another plurality of beam pathways where the different-color reflective beams (not labeled) are transmitted from the LC panel 314a to the polarizing beam splitter 312a, another plurality of beam pathways where the different-color polarized reflective beams 3142a, 3144a and 3146a are transmitted from the polarizing beam splitter 312a to the projecting lens 316a, and another plurality of beam pathways where the different-color projected beams 3162a, 3164a and 3166a are transmitted from the projecting lens 316a to the screen 32e. The method comprises the following steps.

Figure 4:
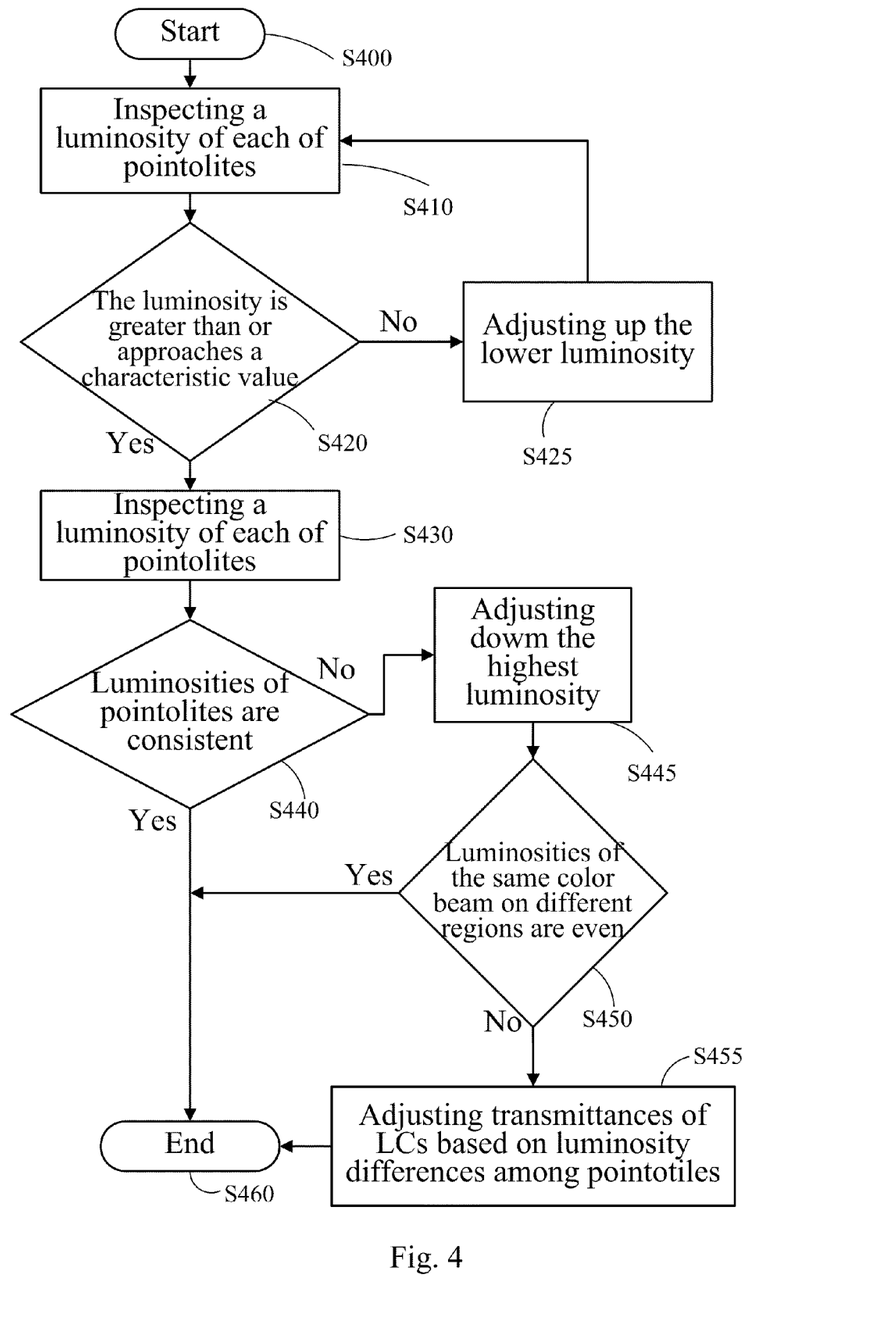
FIG. 4 depicts a flowchart of a method for light compensation according to the present invention.

Step S400, starting to calibrate an uniform illumination of the display system 3a upon a random model, an anytime model, a power-on model or a lower-than-characteristic model, each of which can be predetermined.

Step S410, using at least one detector 3182a, 3184a to inspect at least one first data with regard to a luminous flux, under different time sequences, from at least one of different-color beams which is transmitted from at least one of the different-color pointolites 302a, 304a and 306a through at least one of the beam pathways established in the same inspected region of the display system 3a, wherein the at least one first data is as a luminosity;

Step S420, using the logistic core of the controller 3182a to determine whether a difference occurs between each of the at least one first data inspected and fed back by the at least one detector 3182a, 3184a and a predetermined characteristic value, and especially to determine whether the first data (as the luminosity) of each of the different-color pointolites 302a, 304a and 306a is greater than or approaches the predetermined characteristic value, wherein if the luminosity of any one of the different-color pointolites 302a, 304a and 306a is greater than or approaches the predetermined characteristic value, the procedure will go to the next step S425 whereas the luminosity of none of the different-color pointolites 302a, 304a and 306a is greater than or approaches the predetermined characteristic value, the procedure will go to another step S430;

Step S425, according to the at least one first data and/or the difference send from the at least one detector 3182a, 3184a, using the logistic core of the controller 3182a to determine one of a voltage value, a current value and a time sequence by a lookup table and/or an operation of a calculating unit so as to further determine a quantity of adjusting the luminosity of at least one of the different-color pointolites 302a, 304a and 306a to be greater than or approach the predetermined characteristic value. For example, by a specific applied voltage, the luminosity of one of the different-color pointolites 302a, 304a and 306a, which is lesser than the predetermined characteristic value, will be adjusted up. Then, the procedure goes back to the step S410 as renewedly inspecting whether the first data (as the luminosity) of each of the different-color pointolites 302a, 304a and 306a is greater than or approaches the predetermined characteristic value; and so on and so forth, finally the first data (as the luminosity) of each of the different-color pointolites 302a, 304a and 306a is greater than or approaches the predetermined characteristic value;

Step S430, using at least one detector 3182a, 3184a to inspect at least one second data with regard to a luminous flux, under the same and/or different time sequences, from at least one of the different-color beams which is transmitted from at least one of the different-color pointolites 302a, 304a and 306a through at least one of the beam pathways established on different inspected regions of the display system 3a, wherein the at least one second data is as a luminosity;

Step S440, using the logistic core of the controller 3182a to determine whether at least one difference occurs among a number of second data inspected from the different-color beams passing at least one of the different inspected regions under the different time sequences, wherein if at least one difference occurs among the number of second data, the procedure will go to the next step S445 whereas if the number of second data are the same, the procedure will go to another next step S460;

Step S445, according to the number of second data inspected on the different-color beams and/or the at least one difference, using the logistic core of the controller 3182a to determine one of a voltage value, a current value and a time sequence by the lookup table and/or the operation of the calculating unit so as to adjust the highest luminosity which one of the different-color pointolites 302a, 304a and 306a has to be the lowest luminosity which one of the different-color pointolites 302a, 304a and 306a has, with meeting the predetermined characteristic value;

Step S450, using the logistic core of the controller 3182a to determine whether at least one difference occurs (as unevenness occurs) among the number of second data inspected on the same color beams passing the different inspected regions under the same time sequences, wherein if at least one difference occurs among the number of second data, the procedure will go to the next step S455 whereas if the number of second data are the same, it means that the luminosities of the different-color pointolites 302a, 304a and 306a are even and the procedure will go to another next step S460;

Step S455, according to the number of second data inspected on the same color beams and/or the at least one difference, using the logistic core of the controller 3182a to determine one of a voltage value, a current value and a time sequence to control at least one part of pixel units of the LC panel 314a by the lookup table and/or the operation of the calculating unit so as to adjust the transmittances of at least one part of liquid crystals of the LC panel 314a in the display system 3a. For example, adjusting down the transmittances of at least one part of liquid crystals on an inspected region having the highest luminosity whereby the highest luminosity will correspondingly fall down to reach the lowest luminosity which the other inspected region has; and Step S460, as loon as the number of second data of either the same or different color beams all approach consistence, the uniform illumination calibration of the different-color pointolites 302a, 304a and 306a are finished.

In conclusion, the present invention is capable of actively calibrating the luminosity of each of the pointolites anytime, greatly reducing an inner space of the optical machine device, and lowering the manufacturing cost and the calibrating cost due to the needlessness of using a color separation set, a color filter or color wheel to separate the monochromatic beams of the monochromatic light source into different-color beams as done by the prior art, and the needlessness of designing and arranging the beam pathways and lens in an accurate alignment with the corresponding different-color beam as done by the prior art. Furthermore, the present invention can shorten the beam pathways corresponding to each of the different-color beams and lessen the optical losses among the beam pathways. Moreover, the present invention can raise a uniform illumination of the different-color beams transmitted over the optical machine device.

It is to be understood, however, that even though numerous characteristics and advantages of the present invention have been set fourth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. An optical machine device suited for a display system, comprising:
at least one light source for emitting a illuminating beam;
a polarizing beam splitter for receiving the illuminating beam directed without implementing of color separating/filitering, and correspondingly forming a polarized incident beam;
a liquid crystal panel having a plurality of liquid crystals for receiving the polarized incident beam and correspondingly forming a reflective beam based on a transmittance of at least one of the liquid crystals, wherein the reflective beam passes through the polarizing beam splitter to form a polarized reflective beam;
a projecting lens for receiving the polarized reflective beam and correspondingly forming a projected beam projected out of the optical machine device; and
a controller respectively electrically connected to the at least one light source and the liquid crystal panel, generating a control signal, without a human selection, to control a luminosity of the at least one light source and a direction change of at least one part of the liquid crystals to vary the transmittances of the at least one part of the liquid crystals of the liquid crystal panel, only based on at least one data related to a luminous flux of at least one of the illuminating beam, the polarized incident beam, the reflective beam, the polarized reflective beam and the projected beam.

2. The optical machine device as claimed in claim 1, further comprising a optical lens for possessing a direction of a beam pathway which the illuminating beam is transmitted along.

3. The optical machine device as claimed in claim 1, further comprising at least one detector used for inspecting the at least one data related to the luminous flux of at least one of the illuminating beam, the polarized incident beam, the reflective beam, the polarized reflective beam and the projected beam, whereby the controller can selectively adjusts the luminosity of the at least one light source and/or the transmittances of the at least one part of the liquid crystals, based on said at least one data transmitted from the at least one detector.

4. The optical machine device as claimed in claim 1, wherein the controller further has a logistic core used for determining a quantity of adjusting the luminosity of the at least one light source, according to a difference between said at least one data inspected and a predetermined characteristic value.

5. The optical machine device as claimed in claim 4 wherein the logistic core determines the quantity of adjusting the luminosity of the at least one light source and the transmittances of at least one part of the liquid crystals by a lookup table and/or an operation of a calculating unit, wherein the lookup table and/or the operation of the calculating unit is used to determine one of a voltage value, a current value and a time sequence for the quantity of adjusting the luminosity of at least one of the at least one light source and the transmittances of at least one part of the liquid crystals.

6. An optical machine device suited for a display system, comprising:
a plurality of different-color pointolites for emitting a plurality of different-color illuminating beams;
a optical lens for possessing a beam pathway direction where the different-color illuminating beams are transmitted;
a polarizing beam splitter for directly receiving the different-color illuminating beams possessed by the optical lens and directed without implementing of color separating/filitering, and correspondingly forming a plurality of different-color polarized incident beams;
a liquid crystal panel having a plurality of liquid crystals for receiving the different-color polarized incident beams and correspondingly forming a plurality of different-color reflective beams based on a transmittance of at least one of the liquid crystals, wherein the different-color reflective beams pass through the polarizing beam splitter to form a plurality of different-color polarized reflective beams;

a projecting lens for receiving the different-color polarized reflective beams and correspondingly forming a plurality of different-color projected beams projected out of the optical machine device; and a light compensation scheme having at least one detector for inspecting at least one data related to a luminous flux of at least one of the different-color illuminating beams, the different-color polarized incident beams, the different-color reflective beams, the different-color polarized reflective beams and the different-color projected beams, and a controller for generating a control signal, without a human selection, to control a luminosity of at least one of the pointolites and a direction change of at least one part of the liquid crystals to vary the transmittances of the at least one part of the liquid crystals of the liquid crystal panel, only based on said at least one data transmitted from the at least one detector.

7. The optical machine device as claimed in claim 6, wherein the plurality of pointolites are a plurality of different-color light emitting diodes (LEDs) which are packaged together and emit the different-color illuminating beams in turns under different time sequences based on a color-sequential technology.

8. The optical machine device as claimed in claim 6, wherein the optical lens is a concave lens and possesses the beam pathway direction where the different-color illuminating beams are transmitted in parallel and directly illuminates toward the polarizing beam splitter.

9. The optical machine device as claimed in claim 6, wherein said at least one data inspected is one of a luminous flux, a luminosity, an illuminance and a brightness.

10. The optical machine device as claimed in claim 6, wherein the at least one detector includes a plurality of detectors allocated, differently.

11. The optical machine device as claimed in claim 10, wherein at least one of the detectors is allocated near to an outside of the liquid crystal panel and thereby receives the different-color polarized incident beams.

12. The optical machine device as claimed in claim 10, wherein at least one of the detectors is allocated near to an outside of the polarizing beam splitter and thereby receives the different-color illuminating beams.

13. The optical machine device as claimed in claim 10, wherein at least one of the detectors is allocated near to an outside of the projecting lens and thereby receives the different-color polarized reflective beams.

14. The optical machine device as claimed in claim 10, wherein at least one of the detectors is allocated near to an outside of the optical machine device and thereby receives the different-color projected beams.

15. The optical machine device as claimed in claim 6, wherein the controller further has a logistic core used for determining a quantity of adjusting the luminosity of at least one of the different-color pointolites, according to a difference between said at least one data inspected and a predetermined characteristic value.

16. The optical machine device as claimed in claim 15 wherein the logistic core determines the quantity of adjusting the luminosity of at least one of the different-color pointolites and/or the transmittances of the at least one part of the liquid crystals by a lookup table and/or an operation of a calculating unit, wherein the lookup table and/or the operation of the calculating unit is used to determine one of a voltage value, a current value and a time sequence for the quantity of adjusting the luminosity of at least one of the different-color pointolites and/or the transmittances of the at least one part of the liquid crystals.

17. The optical machine device as claimed in claim 10, wherein the controller further has a logistic core used for determining a quantity of adjusting the luminosity of at least one of the different-color pointolites and the transmittances of the at least one part of the liquid crystals, according to at least one difference among a number of data, with regard to the luminous flux, which are respectively inspected by the plurality of detectors allocated differently, until the number of data inspected approach consistence.

18. The optical machine device as claimed in claim 17 wherein the logistic core determines the quantity of adjusting the luminosity of at least one of the different-color pointolites and the transmittances of the at least one part of the liquid crystals by a lookup table and/or an operation of a calculating unit, wherein the lookup table and/or the operation of the calculating unit is used to determine one of a voltage value, a current value and a time sequence for the quantity of adjusting the luminosity of at least one of the different-color pointolites and/or the transmittances of the at least one part of the liquid crystals.

19. The optical machine device as claimed in claim 10, wherein the controller further has a logistic core used for determining a quantity of adjusting the luminosity of at least one of the different-color pointolites and the transmittances of the at least one part of the liquid crystals, according to at least one difference among a number of data, with regard to the luminous flux, which are respectively inspected by the same detector for different time sequences, until the number of data inspected approach consistence.

20. The optical machine device as claimed in claim 19 wherein the logistic core determines the quantity of adjusting the luminosity of at least one of the different-color pointolites and the transmittances of the at least one part of the liquid crystals by a lookup table and/or an operation of a calculating unit, wherein the lookup table and/or the operation of the calculating unit is used to determine one of a voltage value, a current value and a time sequence for the quantity of adjusting the luminosity of at least one of the different-color pointolites and/or the transmittances of the at least one part of the liquid crystals.

21. A display system, comprising:

a plurality of different-color pointolites for emitting a plurality of different-color illuminating beams;

a optical lens for possessing a beam pathway direction where the different-color illuminating beams are transmitted;

a polarizing beam splitter for directly receiving the different-color illuminating beams possessed by the optical lens and directed without implementing of color separating/filitering, and correspondingly forming a plurality of different-color polarized incident beams;

a liquid crystal panel having a plurality of liquid crystals for receiving the different-color polarized incident beams and correspondingly forming a plurality of different-color reflective beams based on a transmittance of at least one of the liquid crystals, wherein the different-color reflective beams pass through the polarizing beam splitter to form a plurality of different-color polarized reflective beams;

a screen;

a projecting lens receiving the different-color polarized reflective beams and correspondingly forming a plurality of different-color projected beams projected toward the screen and thereby constituting at least one image frame; and a controller generating a control signal, without a human selection, to control a luminosity of at least one of the pointolites and a direction change of at least one part of the liquid crystals to vary the transmittances of the at least one part of the liquid crystals of the liquid crystal panel, only based on at least one data related to a luminous flux of at least one of the different-color illuminating beams, the different-color polarized incident beams, the different-color reflective beams, the different-color polarized reflective beams and the different-color projected beams.

22. A light compensation scheme suited for a display system which comprises a plurality of beam pathways respectively established and interposed, without implementing of color separating/filitering, among a plurality of different-color pointolites, a polarizing beam splitter, a liquid crystal panel having a plurality of liquid crystals, a projecting lens and a screen for transmitting different color beams through the plurality of beam pathways, and the light compensation scheme comprising:

at least one detector applied on the display system and inspecting at least one data related to a luminous flux of the different-color beams from at least one of the plurality of beam pathways; and a controller having a logistic core which generates a control signal, without a human selection, to control s a luminosity of at least one of the pointolites and a direction change of at least one part of the liquid crystals to vary transmittances of the at least one part of the liquid crystals of the liquid crystal panel, only based on said at least one data transmitted from the at least one detector.

23. The light compensation scheme as claimed in claim 22, wherein the logistic core determines a quantity of adjusting the luminosity of at least one of the different-color pointolites, according to a difference between said at least one data inspected and a predetermined characteristic value.

24. The light compensation scheme as claimed in claim 22, wherein the logistic core determines a quantity of adjusting the luminosity of at least one of the different-color pointolites and the transmittances of the at least one part of the liquid crystals, according to at least one difference among a number of data, with regard to the luminous flux, which are respectively inspected by a plurality of detectors allocated differently, until the number of data inspected approach consistence.

25. The light compensation scheme as claimed in claim 22, wherein the logistic core determines a quantity of adjusting the luminosity of at least one of the different-color pointolites and the transmittances of the at least one part of the liquid crystals, according to at least one difference among a number of data, with regard to the luminous flux, which are respectively inspected by the same detector for different time sequences, until the number of data inspected approach consistence.

26. The light compensation scheme as claimed in claim 22, wherein the logistic core determines a quantity of adjusting the luminosity of at least one of the different-color pointolites and/or the transmittances of the at least one part of the liquid crystals by a lookup table and/or an operation of a calculating unit, wherein the lookup table and/or the operation of the calculating unit is used to determine one of a voltage value, a current value and a time sequence for the quantity of adjusting the luminosity of at least one of the different-color pointolites and the transmittances of the at least one part of the liquid crystals.

27. A method for light compensation applied in a display system which comprises a plurality of beam pathways respectively established and interposed, without implementing of color separating/filitering, among a plurality of different-color pointolites, a polarizing beam splitter, a liquid crystal panel having a plurality of liquid crystals, a projecting lens and a screen for transmitting different color beams, and the method comprising the following steps of:

inspecting at least one data, with regard to a luminous flux, from at least one of different-color beams which is transmitted through at least one of the beam pathways; and generating a control signal, without a human selection, to control a luminosity of at least one of the pointolites and a direction change of at least one part of the liquid crystals to vary transmittances of the at least one part of the liquid crystals of the liquid crystal panel, only based on said at least one data.

28. The method as claimed in claim 27, further comprising a step of determining a quantity of adjusting the luminosity of at least one of the different-color pointolites, according to a difference between said at least one data inspected and a predetermined characteristic value.

29. The method as claimed in claim 27, further comprising a step of determining the quantity of adjusting the luminosity of at least one of the different-color pointolites and the transmittances of the at least one part of the liquid crystals, according to at least one difference among a number of data, with regard to the luminous flux, respectively inspected for different regions in the display system and/or different time sequences, until the number of data inspected approach consistence.

30. The method as claimed in claim 27, further comprising a step of determining a quantity of adjusting the luminosity of at least one of the different-color pointolites and the transmittances of the at least one part of the liquid crystals by a lookup table and/or an operation of a calculating unit, wherein the lookup table and/or the operation of the calculating unit is used to determine one of a voltage value, a current value and a time sequence for the quantity of adjusting the luminosity of at least one of the different-color pointolites and/or the transmittances of the at least one part of the liquid crystals.

* * * * *